E. C. LONG.
INTERNAL COMBUSTION ENGINE.
APPLICATION FILED APR. 1, 1913.

1,226,678.

Patented May 22, 1917.
2 SHEETS—SHEET 1.

Attest:
M. C. Hammon
Wm N Scott

Inventor:
Elmer C. Long.
By Knight Bros,
attys.

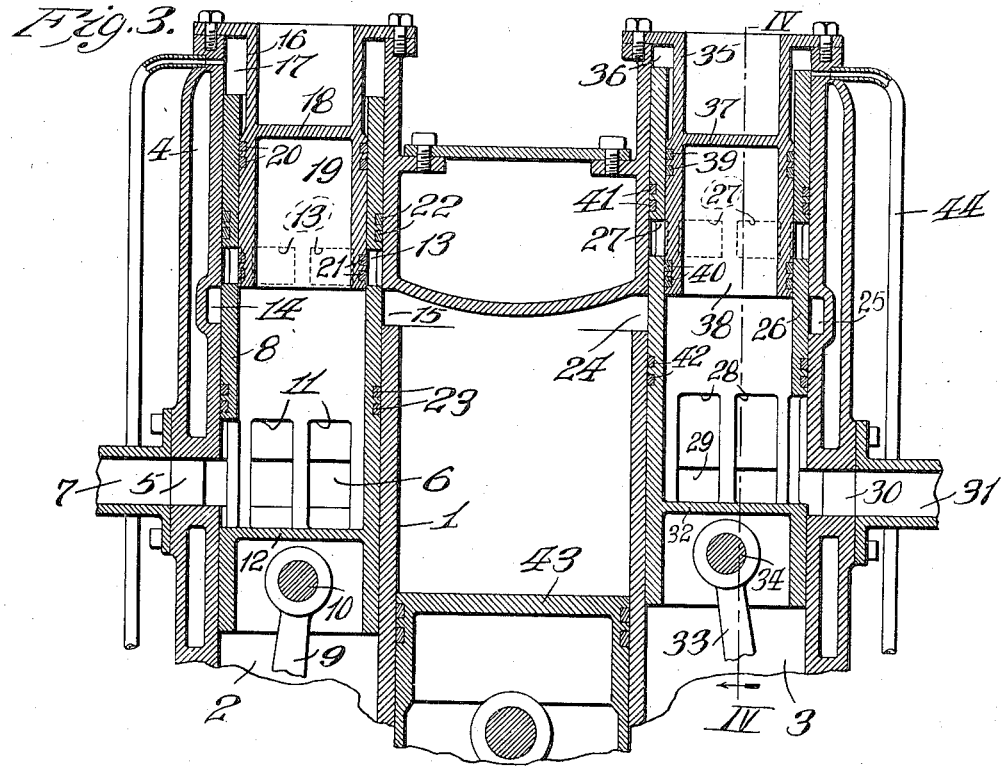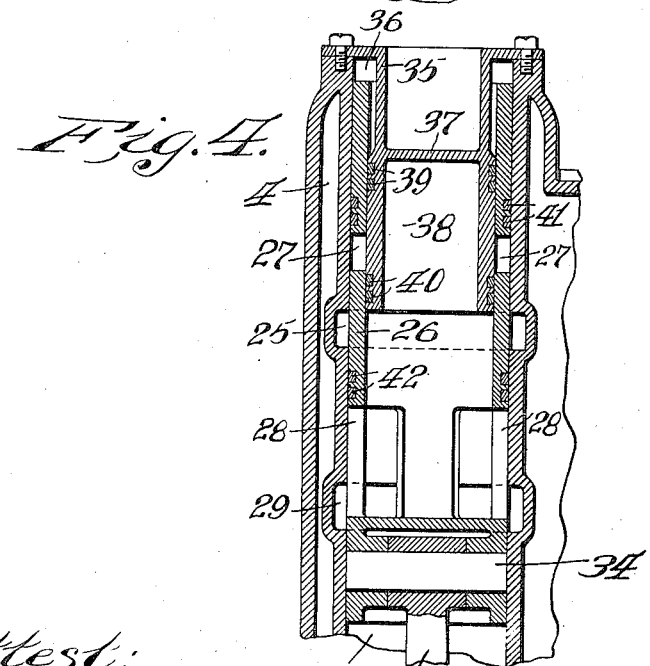

UNITED STATES PATENT OFFICE.

ELMER C. LONG, OF HANNIBAL, MISSOURI.

INTERNAL-COMBUSTION ENGINE.

1,226,678.  Specification of Letters Patent.  Patented May 22, 1917.

Application filed April 1, 1913. Serial No. 758,168.

*To all whom it may concern:*

Be it known that I, ELMER C. LONG, a citizen of the United States of America, residing at Hannibal, in the county of Marion and State of Missouri, have invented certain new and useful Improvements in Internal-Combustion Engines, of which the following is a specification.

This invention relates more especially to internal combustion engines having valves of the reciprocatory type. The primary object of this invention is to provide means whereby the valve pockets which are formed in the engine adjacent the valves are reduced to a minimum, thereby providing for greater explosive energy on the driving piston.

Another object is to provide a sleeve valve of such design that the packing rings thereon will give efficient service.

A further object is to provide an explosive engine with improved valves whereby the exploding and compressing action during the operation of an engine are not accentuated on the valves, thereby providing perfectly balanced valves.

Other and further objects will appear in the specification, and be specifically pointed out in the appended claims, reference being had to the accompanying drawings exemplifying the invention, and in which, Figure 1 is a vertical section of an internal combustion engine constructed in accordance with the principles of the present invention.

Fig. 3 is a vertical section similar to Fig. 1, but showing the position of the valves in different relation to each other.

Fig. 4 is a vertical section on the line IV—IV, Fig. 3.

Figure 1:
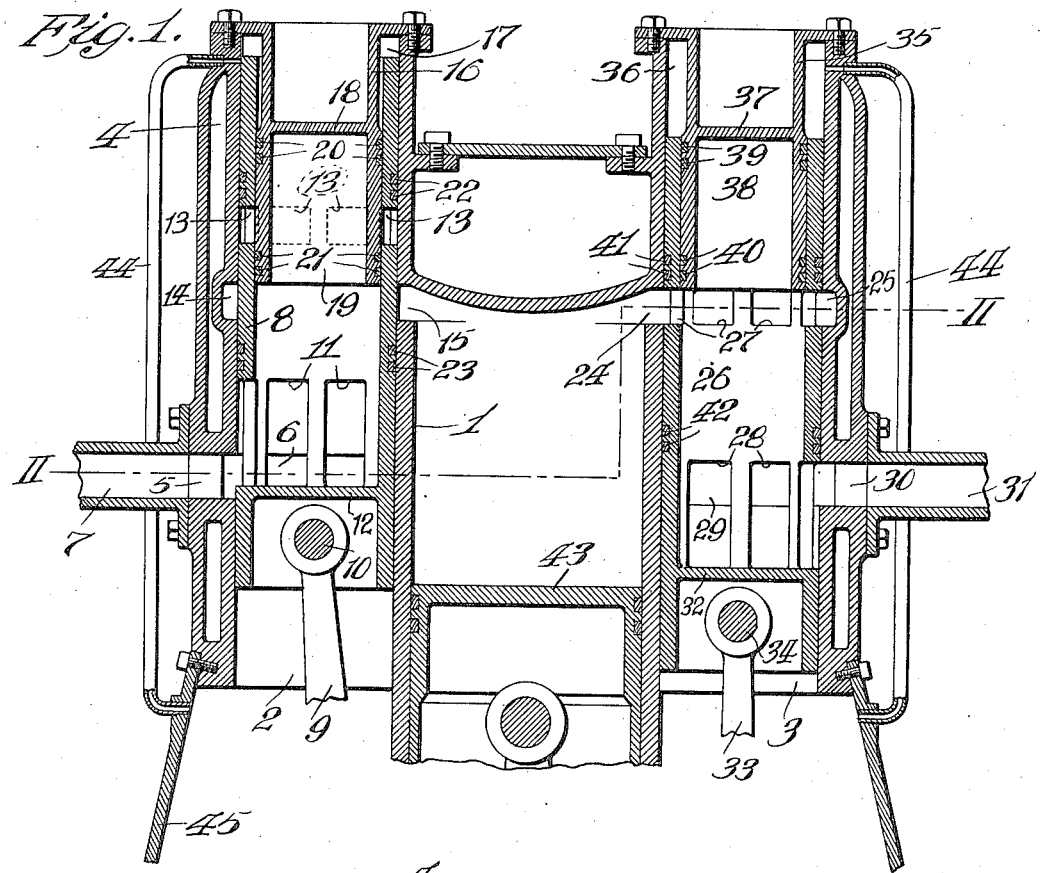
Figure 2:
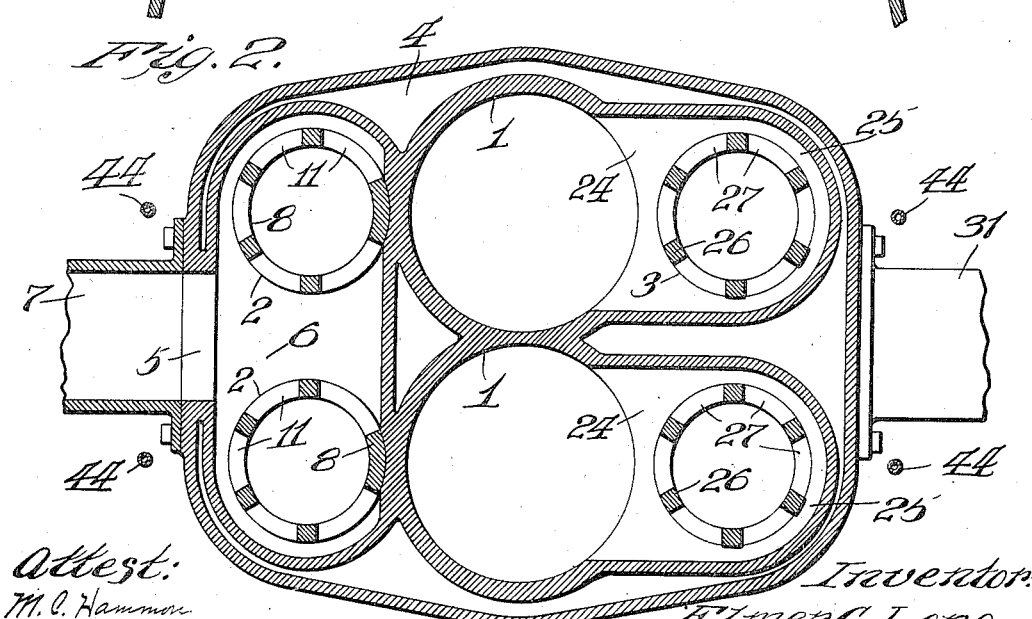
Fig. 2 is a horizontal section taken on the line II—II, Fig. 1.

Referring to the drawings: the engine cylinders 1 are preferably constructed in pairs. Each of said cylinders has an inlet valve chamber 2 and an exhaust valve chamber 3 on opposite sides thereof, said cylinders and valve chambers being surrounded by a water jacket 4.

Located between a pair of the inlet valve chambers 2 is an inlet opening 5 which communicates with a recess 6. Communicating with the inlet opening 5 is an intake connection 7 which leads from the mixture supply. Reciprocably mounted in said intake valve chambers 2 are intake sleeve valves 8, said intake valves receiving their reciprocation from the connecting rods 9 which are connected to said valves by the wrist pins 10. These intake valves 8 have vertical openings 11 formed therein adjacent their lower ends, said openings being always in communication with the recess 6. Formed integral with said valves adjacent the bottom of said openings 11 are horizontal partitions 12. Formed in said intake valves 8, adjacent their upper ends, are openings 13, said openings being much shorter in length than the openings 11. During the reciprocation of said valve, the openings 13 are adapted to communicate with recesses 14. Each recess 14 is formed around one of said valves 8, said recesses being in communication with ports 15, which provide for admission into the cylinders 1.

Mounted on top of the inlet valve chambers 2 are depending cylinder heads 16 which depend downwardly into said intake valves 8 forming annular chambers 17. Formed adjacent the center of each of said depending cylinder heads are horizontal partitions 18, said partitions forming chambers 19 adjacent the lower end of said cylinder heads. Mounted in said depending cylinder heads adjacent and below the horizontal partitions 18 are packing rings 20. Mounted at the lower end of said cylinder heads are packing rings 21, said packing rings 20 and 21 bearing outwardly against the inside walls of said intake sleeve valves 8. Located in said sleeve valves 8, adjacent and above the openings 13 are packing rings 22. Located above the openings 11 of said intake valves 8 are packing rings 23, said packing rings 22 and 23 bearing against the walls of the intake valve chambers 2.

Located in each cylinder 1, and oppositely disposed from each inlet port 15 are outlet ports 24, which ports 24 provide for the exhausting of each cylinder 1 into the recesses 25. Reciprocably mounted in the exhaust valve chamber 3 are exhaust sleeve valves 26, said valves having openings 27 formed therein adjacent the upper end thereof. Said openings are of the same size as the openings 13 in the intake valve 8, and are adapted to communicate with the recesses 25.

Formed in the lower end of said exhaust valve are openings 28, which openings are of the same size as the openings 11 in the intake valve 8, and are adapted to be in communication at all times with the recess 29 which communicates with the discharge opening 30 and the exhaust pipe 31. Formed in each of said exhaust valves 26, adjacent the lower ends of the openings 28, are horizontal partitions 32, said exhaust valves receiving their reciprocation from connecting rods 33 which are connected to said exhaust valves by the wrist pins 34.

Mounted on top of each of said exhaust valve chambers 3 are depending cylinder heads 35, the depending portion of said cylinder heads engaging the inside walls of the exhaust valves 26, forming annular chambers 36. Formed integral with said cylinder heads 35 are horizontal partitions 37 which form chambers 38 in the lower end of said depending cylinder heads. Mounted in said cylinder heads 35 and adjacent said horizontal portion 37, are packing rings 39. Mounted in the lower end of said cylinders are packing rings 40. Said packing rings 39 and 40 are adapted to engage the inside walls of said exhaust valve 26. Mounted on said exhaust valves, adjacent and above the openings 27, are packing rings 41. Mounted above the openings 28 in said exhaust valves are other packing rings 42. Said packing rings 41 and 42 are adapted to engage the walls of the exhaust valve chambers 3.

In the operation of this improved internal combustion engine construction, as shown in Fig. 1, the exhaust valve 26 is in position for exhausting the burnt gases from the cylinder 1, the piston 43 in said cylinder 1 being on the upward stroke. The openings 27 in said exhaust valve are in communication with the outlet port 24 and recess 25. After the exhaust gases have passed through said openings 27, they will pass downwardly inside of said exhaust valve 26 and will then pass out of the openings 28 into the recess 29 through the discharge opening 30 and into the exhaust pipe 31. In the meantime, while said exhaust valve 26 is moving upwardly, communication can still be had with the exhaust pipe 31 through the openings 28, as said openings are adapted to have such a length that they are never out of communication with said discharge pipe 31. Furthermore, after the openings 27 have passed upwardly beyond the outlet port 24, the exhaust valve 26 closing said port, the exhaust gases that still remain inside of said exhaust valve will be forced out by reason of the horizontal portion 32 of said valve traveling upwardly toward the chamber 38 of said depending cylinder head 35. Furthermore, when the exhaust gases first enter into said exhaust valve through the openings 27, said chamber 38 will allow greater expansion area in said exhaust valve from the force of the exhaust gases.

As shown in Fig. 3, the port 15 in the cylinder 1 has just been closed, said cylinder 1 having just received its charge of explosive mixture is about to be compressed. As shown, the solid wall portions of the inlet valve 8 and exhaust valve 26 are adjacent the ports 15 and 24 so that the compression that is about to take place will bear against the outside cylindrical walls of said intake and exhaust valve so that there really will be no force supplied against the operation of said valves. Again, when the explosion takes place, the effect of the explosion will not in any way be detrimental to said valves. It is to be noted that the recesses 14 and 25 which afford communication from and to said intake and exhaust valves, respectively, are of the minimum size so as to allow for the intaking and exhausting of said valves without any resistance. This will afford a much smaller waste of gaseous mixture than heretofore, as the explosion of gases from which energy is derived to the piston 43 is that which is directed solely on said piston.

It is to be noted that by reason of the position which the packing rings 22 and 23 of the intake valves 8, and packing rings 41 and 42 of the exhaust valves 26, assume during the reciprocation of said valves, the rings at no time pass any openings or ports, but are always bearing against the solid cylindrical walls of their respective valve chambers. This arrangement of packing rings will insure very efficient packing of said valves, so that the escape of gases when under compression and explosion is reduced to a minimum. To further assist the packing of said valves, it is to be noted that the depending cylinders 16 and 35 carry the packing rings 20 and 21, and 39 and 40 which bear against the inside walls of their respective valves.

It is thought a valve of this construction, of the sleeve type, the walls thereof bearing against the cool valve chamber walls, will have better valve cooling facilities. In order to lubricate the upper portions of these improved valves, which upper portions reciprocate in their respective annular chambers 17 and 36, pipes such as 44 communicate with the upper portions of said annular chambers and the crank case 45. Inasmuch as the oil which will be contained in said crank chamber is splashed around, the air contained therein will be charged with oil. As a vacuum will be produced during reciprocation of the valves in said annular chambers, the oil and air will be drawn up through said pipes 44 into said annular chambers.

What I claim is:

1. In an internal combustion engine, the combination of a valve chamber, and a crank chamber, a reciprocably mounted hollow valve located in said valve chamber, a depending cylinder head for said valve chamber, said cylinder head adapted to engage the interior of one end of said valve, an annular chamber formed between said depending cylinder head and said valve chamber, and a passageway leading from said crank chamber to said annular chamber.

2. In an internal combustion engine, the combination of a valve chamber, and a crank chamber, a reciprocably mounted hollow valve located in said valve chamber, a depending cylinder head for said valve chamber, a pocket formed in the depending end of said cylinder head, said cylinder head adapted to engage the interior of one end of said valve, an annular chamber formed between said depending cylinder head and said valve chamber, and a passageway leading from said crank chamber to said annular chamber, said pocket of said cylinder head being in communication with the interior of said valve.

3. In an internal combustion engine, a valve chamber, a reciprocally mounted valve open at one end located in said chamber, a cylinder head for said valve chamber, said cylinder head depending downwardly into the open end of said valve, a chamber formed in said cylinder head, said chamber being in communication with the open end of said valve, an annular chamber formed between said cylinder head and the wall of said valve, and a passageway leading from one end of said valve chamber adapted to form means of communication to the other end of said valve chamber.

ELMER C. LONG.

In the presence of—
C. O. MAYES,
W. K. ARNOLD.